(12) United States Patent
Yano et al.

(10) Patent No.: US 7,351,772 B2
(45) Date of Patent: Apr. 1, 2008

(54) ALIPHATIC POLYESTER RESIN COMPOSITION, PREPARATION METHOD THEREOF, AND MOLDED ARTICLE AND FOAMED ARTICLE PRODUCED FROM THE RESIN COMPOSITION

(75) Inventors: Takuma Yano, Uji (JP); Kazue Ueda, Uji (JP); Fumio Matsuoka, Uji (JP); Tatsuya Matsumoto, Uji (JP)

(73) Assignee: Unitika Ltd., Hyogo (JP)

( * ) Notice: Subject to any disclaimer, the term of this patent is extended or adjusted under 35 U.S.C. 154(b) by 94 days.

(21) Appl. No.: 10/560,629

(22) PCT Filed: Jun. 24, 2004

(86) PCT No.: PCT/JP2004/009300

§ 371 (c)(1),
(2), (4) Date: Dec. 12, 2005

(87) PCT Pub. No.: WO2005/000946

PCT Pub. Date: Jan. 6, 2005

(65) Prior Publication Data

US 2006/0276617 A1 Dec. 7, 2006

(30) Foreign Application Priority Data

Jun. 27, 2003 (JP) .............................. 2003-184804

(51) Int. Cl.
*C08F 283/02* (2006.01)
*C08G 63/00* (2006.01)
*C08G 69/00* (2006.01)
*C08J 3/00* (2006.01)

(52) U.S. Cl. ...................... 525/412; 525/413; 528/271; 528/480

(58) Field of Classification Search ................ 525/412, 525/413; 528/271, 480
See application file for complete search history.

(56) References Cited

U.S. PATENT DOCUMENTS 5,500,465 A * 3/1996 Krishnan et al. ............. 524/47
5,618,911 A * 4/1997 Kimura et al. .............. 528/361

FOREIGN PATENT DOCUMENTS

| JP | 2000-017037 | | 1/2000 |
| JP | 2000017037 A | * | 1/2000 |
| JP | 2001151871 A | * | 6/2001 |
| JP | 2001-261797 | | 9/2001 |
| JP | 2002030208 A | * | 1/2002 |
| JP | 2002338796 A | * | 11/2002 |
| JP | 2003-147182 | | 5/2003 |
| JP | 2003147182 A | * | 5/2003 |

OTHER PUBLICATIONS

JP 2002338796 A-english translation JP 2001151871 A-english translation.*
JP 2003147182 A-english translation.*
JP 2002030208 A-english translation.*
JP 2000017037 A-english translation.*
english translation of JP2001151871A, JP2003147182A, JP2002030208A, JP2000017037A, JP 2002338796A.*

* cited by examiner

Primary Examiner—Randy Gulakowski
Assistant Examiner—Alicia M. Toscano
(74) Attorney, Agent, or Firm—Fildes & Outland, P.C.

(57) ABSTRACT

An aliphatic polyester resin composition is provided which is excellent in heat resistance, moldability and hydrolysis resistance. The aliphatic polyester resin composition comprises a biodegradable polyester resin (A) essentially including an α- and/or β-hydroxycarboxylic acid unit and crosslinked by at least one crosslinking agent (B) selected from the group consisting of (meth)acrylate compounds and polyvalent isocyanate compounds, wherein some or all of carboxyl groups of the resin (A) are blocked by 0.01 to 20 parts by mass of a terminal blocking agent (C) based on 100 parts by mass of the resin (A).

9 Claims, 1 Drawing Sheet

F I G. 1 great,

ALIPHATIC POLYESTER RESIN COMPOSITION, PREPARATION METHOD THEREOF, AND MOLDED ARTICLE AND FOAMED ARTICLE PRODUCED FROM THE RESIN COMPOSITION

TECHNICAL FIELD

The present invention relates to an aliphatic polyester resin composition, a preparation method therefor, and a molded article and a foamed article produced from the resin composition. Particularly, the invention relates to an aliphatic polyester resin composition which comprises a crosslinked biodegradable polyester resin with its terminal carboxyl groups at least partly blocked and is excellent in heat resistance, moldability and hydrolysis resistance, and to a preparation method for the resin composition and a molded article and a foamed article produced from the resin composition.

BACKGROUND ART

Polylactic acids are more excellent in heat resistance with higher glass transition temperatures (Tg) than other biodegradable resins, but the heat resistance of the polylactic acids in a temperature range higher than Tg is not necessarily high. Since the polylactic acids have lower crystallization rates, the molding cycle for injection molding should be increased. Further, the polylactic acids have lower melt viscosities, so that molding conditions are significantly limited. Therefore, the molding productivity is relatively low.

For improvement of the heat resistance and the productivity, the inventors of the present invention previously proposed in JP-A-2003-128901 and JP-A-2003-238789 that a biodegradable polyester is crosslinked by addition of a (meth)acrylate compound or a polyvalent isocyanate compound. Further, the inventors proposed in JP-A-2003-147182 that a layered silicate is additionally used.

On the other hand, JP-A-2001-261797 discloses a technique for improving the heat resistance and the hydrolysis resistance by blocking terminal carboxyl groups of a polylactic acid by a specific carbodiimide compound.

The heat resistance and moldability of the polylactic acids are improved by the crosslinking and the addition of the layered silicate. However, the polylactic acids fail to maintain their physical properties due to hydrolysis during prolonged storage or during use under severely humid and hot conditions. Therefore, the practicality of the polylactic acids is not sufficient under such conditions.

Further, the polylactic acid with its terminal groups blocked by the carbodiimide compound as disclosed in JP-A-2001-261797 is not suitable for production of injection molded articles, foamed articles and blow-molded articles.

DISCLOSURE OF THE INVENTION

To solve the aforesaid problems, it is an object of the present invention to provide an aliphatic polyester resin composition excellent in heat resistance, moldability and hydrolysis resistance, a preparation method therefor, and a molded article produced from the resin composition.

The inventors of the present invention have found that the aforesaid problems are solved only by utilizing the crosslinking and the terminal group blocking of a biodegradable aliphatic polyester resin in combination, and attained the present invention.

The present invention is summarized as follows:

(1) An aliphatic polyester resin composition comprising a biodegradable polyester resin (A) which essentially comprises an α- and/or β-hydroxycarboxylic acid unit and crosslinked by at least one crosslinking agent (B) selected from the group consisting of (meth)acrylate compounds and polyvalent isocyanate compounds, wherein some or all of carboxyl groups of the resin (A) are blocked by 0.01 to 20 parts by mass of a terminal blocking agent (C) based on 100 parts by mass of the resin (A).

(2) In the aliphatic polyester resin composition (1), the terminal blocking agent (C) comprises at least one compound selected from the group consisting of carbodiimide compounds, epoxy compounds, oxazoline compounds, oxazine compounds and aziridine compounds.

(3) In the aliphatic polyester resin composition (1), the crosslinking agent (B) is present in a proportion of 0.01 to 10 parts by mass based on 100 parts by mass of the biodegradable polyester resin (A).

(4) In the aliphatic polyester resin composition (1), the biodegradable polyester resin (A) essentially comprises one of poly(L-lactic acid), poly(D-lactic acid), a copolymer of L-lactic acid and D-lactic acid and a blend of poly(L-lactic acid) and poly(D-lactic acid).

(5) The aliphatic polyester resin composition (1) further comprises 0.05 to 30 parts by mass of a layered silicate based on 100 parts by mass of the biodegradable polyester resin (A).

(6) A method for preparing the aliphatic polyester resin composition (1) comprises: mixing a biodegradable polyester resin (A) and a terminal blocking agent (C) and then mixing a crosslinking agent (B) with the resulting mixture.

(7) A molded article or a foamed article is produced from any of the aliphatic polyester resin compositions (1) to (5)

DETAILED DESCRIPTION OF THE INVENTION

The present invention will hereinafter be described in detail.

The biodegradable polyester resin (A) to be used in the present invention essentially comprises an α- and/or β-hydroxycarboxylic acid unit. Examples of the α- and/or β-hydroxycarboxylic acid unit include L-lactic acid, D-lactic acid, glycolic acid, 3-hydroxybutyric acid, 3-hydroxyvaleric acid and 3-hydroxycaproic acid, among which L-lactic acid, D-lactic acid or a mixture of L-lactic acid and D-lactic acid is preferred for industrial mass production.

Therefore, the biodegradable polyester resin (A) to be used in the present invention is poly(L- and/or D-lactic acid), poly(glycolic acid), poly(3-hydroxybutyric acid), poly(3-hydroxyvaleric acid) or poly(3-hydroxycaproic acid), or a copolymer or a blend of any of these polymers.

In consideration of the mechanical strength and heat resistance of an article molded from the inventive aliphatic polyester resin composition, the α- and/or β-hydroxycarboxylic acid unit is preferably present in a proportion of not smaller than 50 mol %, more preferably not smaller than 60 mol %, most preferably not smaller than 75 mol %, in the biodegradable polyester resin (A). The biodegradable polyester resin (A) preferably has a melting point of not lower than 120° C., more preferably not lower than 150° C. The melting point can be controlled by properly selecting the type and amount of the hydroxycarboxylic acid unit.

The biodegradable polyester resin (A) is prepared by a known melt polymerization method, as required, in combination with a solid state polymerization method. Poly(3-hydroxybutyric acid) and poly(3-hydroxyvaleric acid) may be microbiologically prepared.

As required, another biodegradable resin component may be copolymerized or blended with the poly(α- and/or β-hydroxycarboxylic acid) as the major component of the biodegradable polyester resin (A), as long as the heat resistance of the poly(α- and/or β-hydroxycarboxylic acid) is not deteriorated. Examples of the biodegradable resin component include aliphatic polyesters such as polyethylene succinate and polybutylene succinate which are prepared from a diol and a dicarboxylic acid, poly(ω-hydroxyalkanoates) such as poly(ε-caprolactone), poly(butylene succinate-co-butylene terephthalate) and poly(butylene adipate-co-butylene terephthalate) which are biodegradable even with aromatic components, polyester amides, polyester carbonates, and polysaccharides such as starch. A non-biodegradable resin component may be copolymerized or blended with the poly(α- and/or β-hydroxycarboxylic acid) without departing from the scope of the present invention.

The molecular weight of the biodegradable polyester resin is not particularly limited, but the biodegradable polyester resin preferably has a weight average molecular weight of not smaller than 50,000 and not greater than 1,000,000, more preferably not smaller than 80,000 and not greater than 1,000,000. If the weight average molecular weight is smaller than 50,000, the melt viscosity of the resin composition is too low. On the other hand, if the weight average molecular weight is greater than 1,000,000, the moldability of the resin composition is reduced.

The crosslinking agent (B) to be used for crosslinking the biodegradable polyester resin (A) comprises at least one crosslinking agent selected from the group consisting of (meth)acrylate compounds and polyvalent isocyanate compounds. The (meth)acrylate compounds and the polyvalent isocyanate compounds may be used in combination.

Preferred examples of the (meth)acrylate compounds include a compound which contains two or more (meth)acryl groups in its molecule and a compound which contains one or more (meth)acryl groups and one or more glycidyl groups or vinyl groups in its molecule. These compounds are highly reactive with the biodegradable polyester resin (A), and provide a resin composition less liable to contain residual monomers and less liable to be colored. Specific examples of the (meth)acrylate compounds include glycidyl methacrylate, glycidyl acrylate, glycerol dimethacrylate, trimethylolpropane trimethacrylate, trimethylolpropane triacrylate, allyloxypolyethylene glycol monoacrylate, allyloxypolyethylene glycol monomethacrylate, ethylene glycol dimethacrylate, diethylene glycol dimethacrylate, polyethylene glycol dimethacrylate, polyethylene glycol diacrylate, polypropylene glycol dimethacrylate, polypropylene glycol diacrylate and polytetramethylene glycol dimethacrylate (whose alkylene glycol moiety may contain copolymerized alkylenes having various molecular lengths), butandiol methacrylate and butandiol acrylate, among which ethylene glycol dimethacrylate, diethylene glycol dimethacrylate, polyethylene glycol dimethacrylate and polypropylene glycol dimethacrylate are preferred for the safety and the reactivity.

Preferred examples of the polyvalent isocyanate compounds include compounds which are highly reactive with the biodegradable polyester resin (A) and provide a resin composition less liable to contain residual monomers. Specific examples of the polyvalent isocyanate compounds include hexamethylene diisocyanate, tolylene diisocyanate, diphenylmethane diisocyanate, xylylene diisocyanate, naphthylene diisocyanate, isophorone diisocyanate, polyesters modified with polyvalent isocyanates, poly(meth)acrylic acid compounds modified with polyvalent isocyanates and compounds obtained by modifying polyvalent alcohols with polyvalent isocyanates, and mixtures of any of these compounds, among which hexamethylene diisocyanate and tolylene diisocyanate are preferred for the safety and the reactivity.

The aforesaid crosslinking agent (B) is preferably blended in the biodegradable polyester resin (A) in a total amount of 0.01 to 10 parts by mass, more preferably 0.01 to 5 parts by mass, further more preferably 0.01 to 1 part by mass, based on 100 parts by mass of the biodegradable polyester resin (A). If the amount of the crosslinking agent is smaller than 0.01 part by mass, the heat resistance and the moldability intended by the present invention cannot be provided. If the amount of the crosslinking agent is greater than 10 parts by mass, the crosslinking degree is too high, so that the operability is reduced.

Where the polyvalent isocyanate compound is used as the crosslinking agent (B), a blend amount of greater than 5 parts by mass may result in deterioration of the operability and the safety because an unreacted portion of the isocyanate compound is liable to evaporate. Further, reheating reduces the molecular weight of the resulting resin composition. Therefore, the blend amount is preferably not greater than 5 parts by mass based on 100 parts by mass of the biodegradable polyester resin (A).

A method for the crosslinking by the crosslinking agent (B) is not particularly limited, but the simplest method is such that the biodegradable polyester resin (A) is melt-mixed with the crosslinking agent (B). Where the biodegradable polyester resin (A) is melt-mixed with the crosslinking agent (B), a peroxide is preferably added as a crosslinking assist agent for increasing the crosslinking degree. Preferred examples of the peroxide include organic peroxides which are excellent in dispersibility in the resin. Specific examples of the organic peroxides include benzoyl peroxide, bis(butylperoxy)trimethylcyclohexane, bis(butylperoxy)methylcyclododecane, butyl bis(butylperoxy)valerate, dicumyl peroxide, butyl peroxybenzoate, dibutyl peroxide, bis(butylperoxy)diisopropylbenzene, dimethyldi(butylperoxy)hexane, dimethyldi(butylperoxy)hexyne and butylperoxycumene. The peroxide is preferably blended in the biodegradable polyester resin (A) in an amount of 0.1 to 10 parts by mass, more preferably 0.1 to 5 parts by mass, based on 100 parts by mass of the biodegradable polyester resin (A). If the blend amount is smaller than 0.1 part by mass, the effect of increasing the crosslinking degree is reduced. A blend amount of greater than 10 parts by mass is not preferred in terms of costs.

In the inventive aliphatic polyester resin, some or all of carboxyl groups of the biodegradable polyester resin (A) should be blocked by the terminal blocking agent (C). A terminal blocking degree is not particularly limited, but may be properly adjusted depending on the application of the resin. However, the ratio of the blocked terminal carboxyl groups of the resin (A) is preferably not lower than 20%, more preferably not lower than 50%, most preferably not lower than 90%, with respect to the terminal carboxyl groups of the resin (A) before the terminal blocking.

A method for blocking the terminal carboxyl groups of the biodegradable polyester resin (A) is to add a proper amount of a terminal blocking agent of a condensation type such as an aliphatic alcohol or an amide compound into a polymerization system in the polymerization of the resin and cause a dehydration-condensation reaction at a reduced pressure. For easy control of the polymerization degree of the resin, however, it is preferred to add a terminal blocking agent of an addition type upon completion of the polymerization or when the polymerized resin is melted again.

The terminal blocking agent of the addition type preferably comprises at least one compound selected from the group consisting of carbodiimide compounds, epoxy compounds, oxazoline compounds, oxazine compounds and aziridine compounds.

Specific examples of the carbodiimide compounds include N,N'-di-2,6-diisopropylphenylcarbodiimide, N,N'-di-o-tolylcarbodiimide, N,N'-diphenylcarbodiimide, N,N'-dioctyldecylcarbodiimide, N,N'-di-2,6-dimethylphenylcarbodiimide, N-tolyl-N'-cyclohexylcarbodiimide, N,N'-di-2,6-di-tert-butylphenylcarbodiimide, N-tolyl-N'-phenylcarbodiimide, N,N'-di-p-nitrophenylcarbodiimide, N,N'-di-p-aminophenylcarbodiimide, N,N'-di-p-hydroxyphenylcarbodiimide, N,N'-di-cyclohexylcarbodiimide, N,N'-di-p-tolylcarbodiimide, p-phenylenebis-di-o-tolylcarbodiimide, p-phenylenebis-dicyclohexylcarbodiimide, hexamethylenebis-dicyclohexylcarbodiimide, 4,4'-dicyclohexylmethanecarbodiimide, ethylenebis-diphenylcarbodiimide, N,N'-benzylcarbodiimide, N-octadecyl-N'-phenylcarbodiimide, N-benzyl-N'-phenylcarbodiimide, N-octadecyl-N'-tolylcarbodiimide, N-cyclohexyl-N'-tolylcarbodiimide, N-phenyl-N'-tolylcarbodiimide, N-benzyl-N'-tolylcarbodiimide, N,N'-di-o-ethylphenylcarbodiimide, N,N'-di-p-ethylphenylcarbodiimide, N,N'-di-o-isopropylphenylcarbodiimide, N,N'-di-p-isopropylphenylcarbodiimide, N,N'-di-o-isobutylphenylcarbodiimide, N,N'-di-p-isobutylphenylcarbodiimide, N,N'-di-2,6-diethylphenylcarbodiimide, N,N'-di-2-ethyl-6-isopropylphenylcarbodiimide, N,N'-di-2-isobutyl-6-isopropylphenylcarbodiimide, N,N'-di-2,4,6-trimethylphenylcarbodiimide, N,N'-di-2,4,6-triisopropylphenylcarbodiimide, N,N'-di-2,4,6-triisobutylphenylcarbodiimide, diisopropylcarbodiimide, dimethylcarbodiimide, diisobutylcarbodiimide, dioctylcarbodiimide, t-butylisopropylcarbodiimide, di-β-naphthylcarbodiimide, di-t-butylcarbodiimide and aromatic polycarbodiimides. Other examples of the carbodiimide compounds include polymers of any of these compounds. These carbodiimide compounds may be used either alone or in combination. In the present invention, any of the aromatic carbodiimides, in particular N,N'-di-2,6-diisopropylphenylcarbodiimide, or a polymer of any of these compounds (having a polymerization degree of about 2 to about 20) is desirably used. It is particularly preferred to use any of the carbodiimide compounds having a saturated cyclic structure such as a cyclohexane ring, particularly 4,4'-dicyclohexylmethane carbodiimide, or a polymer of any of these compounds (having a polymerization degree of about 2 to about 20).

Examples of the epoxy compounds include
N-glycidylphthalimide, N-glycidyl-4-methylphthalimide, N-glycidyl-4,5-dimethylphthalimide, N-glycidyl-3-methylphthalimide, N-glycidyl-3,6,-dimethylphthalimide, N-glycidyl-4-ethoxyphthalimide, N-glycidyl-4-chlorophthalimide, N-glycidyl-4,5-dichlorophthalimide, N-glycidyl-3,4,5,6-tetrabromophthalimide, N-glycidyl-4-n-butyl-5-bromophthalimide, N-glycidylsuccinimide, N-glycidylhexahydrophthalimide, N-glycidyl-1,2,3,6-tetrahydrophthalimide, N-glycidylmaleinimide, N-glycidyl-α,β-dimethylsuccinimide, N-glycidyl-α-ethylsuccinimide, N-glycidyl-α-propylsuccinimide, N-glycidylbenzamide, N-glycidyl-p-methylbenzamide, N-glycidylnaphthamide, N-glycidylstearamide, N-methyl-4,5-epoxycyclohexane-1,2-dicarboxylimide, N-ethyl-4,5-epoxycyclohexane-1,2-dicarboxylimide, N-phenyl-4,5-epoxycyclohexane-1,2-dicarboxylimide, N-naphthyl-4,5-epoxycyclohexane-1,2-dicarboxylimide, N-tolyl-3-methyl-4,5-epoxycyclohexane-1,2-dicarboxyl imide, o-phenylphenyl glycidyl ether, 2-methyloctyl glycidyl ether, phenyl glycidyl ether, 3-(2-xenyloxy)-1,2-epoxypropane, allyl glycidyl ether, butyl glycidyl ether, lauryl glycidyl ether, benzyl glycidyl ether, cyclohexyl glycidyl ether, α-cresyl glycidyl ether, p-t-butylphenyl glycidyl ether, glycidyl methacrylate, ethylene oxide, propylene oxide, styrene oxide, octylene oxide, 2-ethylhexyl glycidyl ether, hydroquinone diglycidyl ether, resorcin diglycidyl ether, 1,6-hexanediol diglycidyl ether and hydrogenated bisphenol-A diglycidyl ether. Other examples of the epoxy compounds include diglycidyl terephthalate, diglycidyl tetrahydrophthalate, diglycidyl hexahydrophthalate, dimethyl diglycidyl phthalate, phenylene diglycidyl ether, ethylene diglycidyl ether, trimethylene diglycidyl ether, tetramethylene diglycidyl ether, hexamethylene diglycidyl ether, sorbitol diglycidyl ether, polyglycerol polyglycidyl ether, pentaerythritol polyglycidyl ether, diglycerol polyglycidyl ether, glycerol polyglycidyl ether, trimethylolpropane polyglycidyl ether, resorcinol diglycidyl ether, neopentylglycol diglycidyl ether, ethylene glycol diglycidyl ether, diethylene glycol diglycidyl ether, polyethylene glycol diglycidyl ether, propylene glycol diglycidyl ether, dipropylene glycol diglycidyl ether, polypropylene glycol diglycidyl ether and polybutadiene glycol diglycidyl ether.

One or two or more compounds may be arbitrarily selected from these epoxy compounds for blocking the terminal carboxyl groups of the aliphatic polyester resin. In terms of the reactivity, ethylene oxide, propylene oxide, phenyl glycidyl ether, o-phenylphenyl glycidyl ether, p-t-butylphenyl glycidyl ether, N-glycidylphthalimide, hydroquinone diglycidyl ether, resorcin diglycidyl ether, 1,6-hexanediol diglycidyl ether, hydrogenated bisphenol-A diglycidyl ether, ethylene glycol diglycidyl ether, polyethylene glycol diglycidyl ether, 1,6-hexanediol diglycidyl ether and trimethylolpropane polyglycidyl ether are preferred.

Specific examples of the oxazoline compounds include 2-methoxy-2-oxazoline, 2-ethoxy-2-oxazoline, 2-propoxy-2-oxazoline, 2-butoxy-2-oxazoline, 2-pentyloxy-2-oxazoline, 2-hexyloxy-2-oxazoline, 2-heptyloxy-2-oxazoline, 2-octyloxy-2-oxazoline, 2-nonyloxy-2-oxazoline, 2-decyloxy-2-oxazoline, 2-cyclopentyloxy-2-oxazoline, 2-cyclohexyloxy-2-oxazoline, 2-allyloxy-2-oxazoline, 2-methallyloxy-2-oxazoline, 2-crotyloxy-2-oxazoline, 2-phenoxy-2-oxazoline, 2-cresyl-2-oxazoline, 2-o-ethylphenoxy-2-oxazoline, 2-o-propylphenoxy-2-oxazoline, 2-o-phenylphenoxy-2-oxazoline, 2-m-ethylphenoxy-2-oxazoline, 2-m-propylphenoxy-2-oxazoline, 2-p-phenylphenoxy-2-oxazoline, 2-methyl-2-oxazoline, 2-ethyl-2-oxazoline, 2-propyl-2-oxazoline, 2-butyl-2-oxazoline, 2-pentyl-2-oxazoline, 2-hexyl-2-oxazoline, 2-heptyl-2-oxazoline, 2-octyl-2-oxazoline, 2-nonyl-2-oxazoline, 2-decyl-2-oxazoline, 2-cyclopentyl-2-oxazoline, 2-cyclohexyl-2-oxazoline, 2-allyl-2-oxazoline, 2-methallyl-2-oxazoline, 2-crotyl-2-oxazoline, 2-phenyl-2-oxazoline, 2-o-ethylphenyl-2-oxazoline, 2-o-propylphenyl-2-oxazoline, 2-o-phenylphenyl-2-oxazoline, 2-m-ethylphenyl-2-oxazoline, 2-m-propylphenyl-2-oxazoline and 2-p-phenylphenyl-2-oxazoline. Other examples of the oxazoline compounds include 2,2'-bis(2-oxazoline), 2,2'-bis(4-methyl-2-oxazoline), 2,2'-bis(4,4'-dimethyl-2-oxazoline), 2,2'-bis(4-ethyl-2-oxazoline), 2,2'-bis(4,4'-diethyl-2-oxazoline), 2,2'-bis(4-propyl-2-oxazoline), 2,2'-bis(4-butyl-2-oxazoline), 2,2'-bis(4-hexyl-2-oxazoline), 2,2'-bis(4-phenyl-2-oxazoline), 2,2'-bis(4-cyclohexyl-2-oxazoline), 2,2'-bis(4-benzyl-2-oxazoline), 2,2'-p-phenylenebis(2-oxazoline), 2,2'-m-phenylenebis(2-oxazoline), 2,2'-o-phenylenebis(2-oxazoline), 2,2'-p-phenylenebis(4-methyl-2-oxazoline), 2,2'-p-phenylenebis(4,4'-dimethyl-2-oxazoline), 2,2'-m-phenylenebis(4-methyl-2-oxazoline), 2,2'-m-phenylenebis(4,4'-dimethyl-2-oxazoline), 2,2'-ethylenebis(2-oxazoline), 2,2'-tetramethylenebis(2-oxazoline), 2,2'-hexamethylenebis(2-oxazoline), 2,2'-octamethylenebis(2-oxazoline), 2,2'-decamethylenebis(2-oxazoline), 2,2'-ethylenebis(4-methyl-2-oxazoline), 2,2'-tetramethylenebis(4,4'-dimethyl-2-oxazoline), 2,2'-9,9'-diphenoxyethanebis(2-oxazoline), 2,2'-cyclohexylenebis(2-oxazoline) and 2,2'-diphenylenebis(2-oxazoline).

Further other examples of the oxazoline compounds include polyoxazoline compounds containing any of the aforesaid compounds as a monomer unit, e.g., copolymers of styrene and 2-isopropenyl-2-oxazoline. One or two or more compounds may be arbitrarily selected from the aforesaid oxazoline compounds for blocking the terminal carboxyl groups of the biodegradable polyester resin (A). In terms of the heat resistance, the reactivity and the affinity for the biodegradable polyester resin (A), 2,2'-m-phenylenebis(2-oxazoline) and 2,2'-p-phenylenebis(2-oxazoline) are preferred.

Specific examples of the oxazine compounds include 2-methoxy-5,6-dihydro-4H-1,3-oxazine, 2-ethoxy-5,6-dihydro-4H-1,3-oxazine, 2-propoxy-5,6-dihydro-4H-1,3-oxazine, 2-butoxy-5,6-dihydro-4H-1,3-oxazine, 2-pentyloxy-5,6-dihydro-4H-1,3-oxazine, 2-hexyloxy-5,6-dihydro-4H-1,3-oxazine, 2-heptyloxy-5,6-dihydro-4H-1,3-oxazine, 2-octyloxy-5,6-dihydro-4H-1,3-oxazine, 2-nonyloxy-5,6-dihydro-4H-1,3-oxazine, 2-decyloxy-5,6-dihydro-4H-1,3-oxazine, 2-cyclopentyloxy-5,6-dihydro-4H-1,3-oxazine, 2-cyclohexyloxy-5,6-dihydro-4H-1,3-oxazine, 2-allyloxy-5,6-dihydro-4H-1,3-oxazine, 2-methallyloxy-5,6-dihydro-4H-1,3-oxazine and 2-crotyloxy-5,6-dihydro-4H-1,3-oxazine. Other examples of the oxazine compounds include 2,2'-bis(5,6-dihydro-4H-1,3-oxazine), 2,2'-methylenebis(5,6-dihydro-4H-1,3-oxazine), 2,2'-ethylenebis(5,6-dihydro-4H-1,3-oxazine), 2,2'-propylenebis(5,6-dihydro-4H-1,3-oxazine), 2,2'-butylenebis(5,6-dihydro-4H-1,3-oxazine), 2,2'-hexamethylenebis(5,6-dihydro-4H-1,3-oxazine), 2,2'-p-phenylenebis(5,6-dihydro-4H-1,3-oxazine), 2,2'-m-phenylenebis(5,6-dihydro-4H-1,3-oxazine), 2,2'-naphthylenebis(5,6-dihydro-4H-1,3-oxazine) and 2,2'-P,P'-diphenylenebis(5,6-dihydro-4H-1,3-oxazine). Further other examples of the oxazine compounds include polyoxazine compounds containing any of the aforesaid compounds as a monomer unit. One or two or more compounds may be arbitrarily selected from the aforesaid oxazine compounds for blocking the terminal carboxyl groups of the biodegradable polyester resin (A) such as polylactic acid.

Specific examples of the aziridine compounds include compounds obtained by addition reaction of a mono-, bis- or poly-isocyanate compound and ethyleneimine.

The terminal blocking agent (C) should be blended in the biodegradable polyester resin (A) in an amount of 0.01 to 20 parts by mass, preferably 0.05 to 10 parts by mass, more preferably 0.5 to 8 parts by mass, based on 100 parts by mass of the biodegradable polyester resin (A). If the blend amount is smaller than 0.01 part by mass, the hydrolysis resistance intended by the present invention cannot be provided. On the other hand, a blend amount of greater than 20 parts by mass is neither effective nor preferable in terms of costs.

The inventive aliphatic polyester resin composition is prepared by melt-mixing the biodegradable polyester resin (A), the crosslinking agent (B) and the terminal blocking agent (C) by means of a common extruder such as a uniaxial extruder or a biaxial extruder, a roll kneader, a Brabender kneader or the like. At this time, it is also effective to use a static mixer or a dynamic mixer in combination with the extruder. In order to facilitate the kneading, it is preferred to use the biaxial extruder.

In the present invention, it is preferred to add the terminal blocking agent (C) to the biodegradable polyester resin (A), knead the resulting mixture, then add the crosslinking agent (B) to the mixture and knead the mixture. By blending the terminal blocking agent (C) and the crosslinking agent (B) in this order, the resin composition is effectively imparted with the hydrolysis resistance. Therefore, it is preferred to employ, for example, a method such that the biodegradable polyester resin (A) and the terminal blocking agent (C) are supplied into a main supply port of the extruder and then the crosslinking agent (B) is added from a middle portion of the extruder or a method such that the biodegradable polyester resin (A) is supplied into a main supply port of the extruder, then the terminal blocking agent (C) is added from a first feed port provided at the middle of the extruder (a feed port closest to the main supply port) and the crosslinking agent (B) is added from a second or subsequent feed port. Alternatively, the biodegradable polyester resin (A) preliminarily terminal-blocked and the crosslinking agent (B) may be supplied together into the extruder, and kneaded.

When the ingredients are supplied into the extruder, the ingredients may be dry-blended, and a known transport means such as a powder feeder or a pressure pump may be used.

The layered silicate (D) may be blended in the inventive aliphatic polyester resin composition for further improvement of the moldability of the resin. The layered silicate may be a natural silicate or a synthetic silicate. Exemplary preparation methods for the synthetic silicate are a melt method, an intercalation method and a hydrothermal method, and the silicate may be synthesized by any of these methods. Preferred examples of the layered silicate include smectites, vermiculites and swelled fluorinated mica. Examples of the smectites include montmorillonite, beidellite, hectorite and saponite. Examples of the swelled fluorinated mica include Na-type silicon tetrafluoride mica, Na-type taeniolite and Li-type taeniolite. Among these layered silicates, montmorillonite and Na-type silicon tetrafluoride mica are preferred. A cation exchange capacity is preferably 25 to 200 meq/100 g.

The layered silicate (D) is preferably blended in the biodegradable polyester resin (A) in an amount of 0.05 to 30 parts by mass, more preferably 0.1 to 15 parts by mass, further more preferably 0.5 to 10 parts by mass, based on 100 parts by mass of the biodegradable polyester resin (A). If the blend amount is smaller than 0.05 parts by mass, improvement of the heat resistance and the moldability cannot be expected. On the other hand, if the blend amount is greater than 30 parts by mass, it is difficult to finely disperse the layered silicate in the resin, and the resulting resin is liable to have a reduced toughness.

It is preferred to preliminarily treat the layered silicate (D) with organic cations. Examples of the organic cations include protonized primary to tertiary amines, quaternary ammoniums and organic phosphoniums. Examples of the primary amines include octylamine, dodecylamine and octadecylamine. Examples of the secondary amines include dioctylamine, methyloctadecylamine and dioctadecylamine. Examples of the tertiary amines include dimethyloctylamine, dimethyldecylamine, dimethyllaurylamine, dimethylmyristylamine, dimethylpalmitylamine, dimethylstearylamine, dilaurylmonomethylamine, tributylamine, N,N-dimethylaniline, trioctylamine, dimethyldodecylamine and didodecylmonomethylamine. Examples of the quaternary ammoniums include tetraethylammonium, trimethyloctadecylammonium, dimethyldioctadecylammonium, dihydroxyethylmethyloctadecylammonium, methyldodecylbis(polyethylene glycol)ammonium and methyldiethyl(polypropylene glycol)ammonium. Examples of the organic phosphoniums include tetraethylphosphonium, tetrabutylphosphonium, tetrakis(hydroxymethyl)phosphonium and 2-hydroxyethyltriphenylphosphonium. These cations may be used either alone or in combination.

A method for treating the layered silicate with the organic cations is to disperse the layered silicate in water or an alcohol and add a salt of the organic cations to the resulting dispersion with stirring to exchange inorganic ions of the layered silicate with the organic cations, followed by filtering, washing and drying of the resulting product.

Where the layered silicate (D) is used in the present invention, an alkylene oxide or a compound having a hydroxycarboxylic acid unit may be added as a dispersion improving agent to the biodegradable polyester resin (A) for improvement of the dispersibility of the layered silicate (D) in the biodegradable polyester resin (A). Such a compound has affinity for both the biodegradable polyester resin and the layered silicate, and is easily intercalated between layers of the layered silicate to improve the dispersibility of the layered silicate in the resin. Examples of the alkylene oxide include polyethylene glycol and polypropylene glycol. Examples of the compound having a hydroxycarboxylic acid unit include polylactic acid, polyhydroxybutyric acid and poly(ε-caprolactone). The compound having a hydroxycarboxylic acid unit may be a compound with its terminal carboxyl groups replaced with hydroxyl groups (e.g., polycaprolactondiol). The compound to be used as the dispersion improving agent preferably has a number average molecular weight of 200 to 50,000, more preferably 500 to 20,000. If the molecular weight is smaller than 200, a gas will emanate during the molding or bleed-out from the resulting molded article will occur. If the molecular weight is higher than 50,000, the intercalation of the compound between the layers of the layered silicate will be insufficient.

The dispersion improving agent is preferably blended in the biodegradable polyester resin (A) in an amount of 0.01 to 20 parts by mass, more preferably 0.02 to 10 parts by mass, based on 100 parts by mass of the biodegradable polyester resin (A). If the blend amount is smaller than 0.01 part by mass, the effect of the addition of the dispersion improving agent will be small. If the blend amount is greater than 20 parts by mass, the mechanical strength and the heat resistance of the resin will be reduced. Exemplary methods for blending the dispersion improving agent include a method such that the layered silicate (D) is preliminarily impregnated with the dispersion improving agent, a method such that the dispersion improving agent is mixed with the layered silicate (D) in the presence of water or an organic solvent and then the water or the organic solvent is removed by filtering or the like, a method such that the dispersion improving agent is added when the biodegradable polyester resin and the layered silicate are melt-kneaded, and a method such that the dispersion improving agent is added together with the layered silicate when the biodegradable polyester resin is synthesized. Among these methods, the method of preliminarily mixing the dispersion improving agent with the layered silicate is preferred.

A pigment, a heat stabilizer, an antioxidant, a weather resistant agent, a flame retarder, a plasticizer, a lubricant, a mold release agent, an antistatic agent, a filler or the like may be added to the inventive aliphatic polyester resin composition, as long as the properties of the aliphatic polyester resin composition are not significantly deteriorated. Examples of the heat stabilizer and the antioxidant include hindered phenols, phosphorus compounds, hindered amines, sulfur compounds, copper compounds and halides of alkali metals, and mixtures of any of these compounds. The heat stabilizer, the antioxidant, the weather resistant agent or a like additive is generally added during the melt kneading or the polymerization. Exemplary inorganic fillers include talc, calcium carbonate, zinc carbonate, wollastonite, silica, alumina, magnesium oxide, calcium silicate, sodium aluminate, calcium aluminate, sodium aluminosilicate, magnesium silicate, glass balloon, carbon black, zinc oxide, antimony trioxide, zeolites, hydrotalcite, metal fibers, metal whiskers, ceramic whiskers, potassium titanate, boron nitride, graphite, glass fibers and carbon fibers. Exemplary organic fillers include naturally existing polymers such as starch, cellulose particles, wood powder, bean curd refuse, chaff, wheat bran and kenaf, and products obtained by modifying these polymers.

A method for mixing another thermoplastic resin and/or the filler with the inventive aliphatic polyester resin composition is not particularly limited. For example, the aliphatic polyester resin, the thermoplastic resin and/or the filler are kneaded by means of a uniaxial extruder, a biaxial extruder, a roll kneader, a Brabender kneader or the like after heating and melting. It is also effective to use a static mixer or a dynamic mixer in combination with the aforesaid extruder.

Various articles can be molded from the inventive aliphatic polyester resin composition by a known molding method. At least one molding method selected from an injection molding method, a blow molding method, an extrusion molding method and a foam molding method is preferably used.

An ordinary injection molding method as well as a gas injection molding method, an injection press molding method and an expansion injection molding method may be employed as the injection molding method. A cylinder temperature for the injection molding should be not lower than the melting point Tm or the fluidizing temperature of the resin, preferably 180 to 230° C., more preferably 190 to 220° C. If the molding temperature is too low, short molding will occur to result in unstable molding, and overload is liable to occur. On the other hand, if the molding temperature is too high, the aliphatic polyester resin will be decomposed and, therefore, the resulting molded article will have a reduced strength or be colored. The temperature of a mold should be not higher than Tm−20° C. Where the crystallization of the biodegradable polyester resin in the mold is to be promoted for increasing the heat resistance of the biodegradable polyester resin, the mold temperature is preferably kept at a temperature of Tg+20° C. to Tm−20° C. for a predetermined period and then cooled to not higher than Tg. Where the crystallization of the resin in the mold is not required, the mold temperature may be immediately cooled to not higher than Tg. Where post-crystallization is required, heat treatment is preferably performed at a temperature of Tg to Tm−20° C.

Exemplary blow molding methods to be employed for producing a blow-molded article from the inventive aliphatic polyester resin composition include a direct blow molding method in which the article is molded directly from material chips, an injection blow molding method in which a preform (bottomed parison) prepared by injection molding is blow-molded, and a draw blow molding method. Further, a hot parison method in which a preform is blow-molded immediately after preparation of the preform, or a cold parison method in which a preform is once cooled and taken out and then reheated to be blow-molded may be employed. A temperature for the blow molding should be Tg+20° C. to Tm−20° C. If the blow molding temperature is lower than Tg+20° C., the molding will be difficult, and the resulting blow-molded container will have an insufficient heat resistance. On the other hand, if the blow molding temperature is higher than Tm−20° C., the resulting blow-molded container is liable to have an uneven wall thickness, and draw-down will occur due to reduction of viscosity.

The extrusion molding method to be employed for producing an extrusion-molded article from the inventive aliphatic polyester resin composition will be described. A T-die method or a round die method may be employed as the extrusion molding method. A temperature for the extrusion molding should be not lower than the melting point Tm or the fluidizing temperature of the aliphatic polyester resin composition, preferably 180 to 230° C., more preferably 190 to 220° C. If the molding temperature is too low, unstable molding will result, and overload is liable to occur. On the other hand, if the molding temperature is too high, the biodegradable polyester resin (A) will be decomposed and, therefore, the resulting extrusion-molded article will have a reduced strength or be colored. Sheets, pipes and the like are produced by the extrusion molding. For improvement of the heat resistance of these articles, a heat treatment may be performed at a temperature not lower than the glass transition temperature (Tg) of the aliphatic polyester resin composition and not higher than Tm−20° C.

The sheets thus produced may be deep-drawn, for example, by vacuum forming, air pressure forming or vacuum air pressure forming. Temperatures for the deep drawing and the heat treatment are preferably from Tg+20° C. to Tm−20° C. If the deep drawing temperature is lower than Tg+20° C., the deep drawing will be difficult, and the resulting container is liable to have an insufficient heat resistance. On the other hand, if the deep drawing temperature is higher than Tm−20° C., the resulting container is liable to have an uneven wall thickness and a poorer impact resistance with its orientation lost.

Any common foaming methods may be employed for producing a foamed article from the inventive aliphatic polyester resin composition. By means of an extruder, for example, a foaming agent decomposable at the melting point of the resin is preliminarily blended with the resin and the resulting mixture is extruded from a slit-like nozzle into a sheet or from a round nozzle into a strand. Examples of the decomposable foaming agent include azo compounds such as azodicarbonamides and barium azodicarboxylates, nitroso compounds such as N,N'-dinitrosopentamethylenetetramine, hydrazine compounds such as 4,4'-oxybis(benzene sulfonyl hydrazide) and hydrazicarbonamide, and inorganic foaming agents such as sodium hydrogencarbonate. Alternatively, a volatile foaming agent may be injected from a middle portion of the extruder for foaming the resin. Examples of such a foaming agent include inorganic substances such as nitrogen, carbon dioxide and water, and organic solvents typified by hydrocarbons such as methane, ethane, butane and pentane, fluorinated compounds and alcohols such as ethanol and methanol. Further, foamed particles may be produced by preparing particles of the resin composition, preliminarily impregnating the resin particles with the organic solvent, water or a like foaming agent, and changing the temperature and/or the pressure to foam the resin particles.

By employing any of the aforesaid molding methods, various molded articles can be produced from the inventive aliphatic polyester resin composition. Specific examples of the molded articles include tableware such as dishes, bowls, pots, chopsticks, spoons, forks and knives, containers for fluids, container caps, rulers, stationery such as writing utensils, clear cases and CD cases, daily commodities such as sink corner strainers, trash boxes, washbowls, tooth brushes, combs and hangers, agricultural and horticultural materials such as flower pots and seeding pots, toys such as plastic models, electrical appliance resin components such as air conditioner panels, refrigerator trays and housings, and automotive resin components such as bumpers, interior panels and door trims.

Specific examples of the containers for fluids include drinking cups and beverage bottles for milk beverages, cold beverages and alcoholic beverages, temporary storage containers for seasonings such as soy sauce, sauce, mayonnaise, ketchup and cooking oil, containers for shampoo and rinse, cosmetic containers, and agricultural containers. The shapes of the containers for fluids are not particularly limited, but the containers preferably have a depth of not smaller than 5 mm for containing the fluids. The wall thicknesses of the containers are not particularly limited, but are preferably not smaller than 0.1 mm, more preferably 0.1 to 5 mm, for strength.

Sheets and pipes can be produced from the inventive aliphatic polyester resin composition. Specific applications of the sheets and the pipes include material sheets for deep drawing, material sheets for batch foaming, cards such as credit cards, desk pads, clear files, straws, and agricultural and horticultural rigid pipes. Further, the sheets may be deep-drawn for production of deep-drawn articles such as food containers, agricultural and horticultural containers, blister packages and press-through packages. The shapes of the deep-drawn articles are not particularly limited, but the deep-drawn articles preferably have depths of not smaller than 2 mm for containing food, goods and drugs. Further, the deep-drawn articles preferably have wall thicknesses of not smaller than 50 µm, more preferably 150 to 500 µm. Specific examples of the food containers include fresh food trays, instant food containers, fast food containers and lunch boxes. Specific examples of the agricultural and horticultural containers include seeding pots. Specific examples of the blister packages include food containers as well as packages for various commodities including stationery, toys and dry batteries.

Examples of the foamed articles produced from the inventive resin composition include: bulk containers, pads for iron containers and cushioning materials in a packaging field; binders, cut files and cut boxes in a stationery field; core materials for partitions, sign boards, buffer wall materials and camping floor boards in an architectural field; cases for video cameras and cassettes and core materials for OA cases in an electrical appliance field; fresh food packages, confectionery packages and food trays in a food field; door mats, toilet mats, kitchen mats, bath mats, garden mats, mats for hospitals, screen materials and animal rejection fences in a daily commodity material field; seed beds and cases for hydroponic seed bases in an agricultural material field; and fish net buoys, fishing floats, oil fence buoys and cooler boxes in a fishery material field.

According to the present invention, the aliphatic polyester resin composition excellent in heat resistance, moldability and hydrolysis resistance can be provided by an industrially feasible technique. The resin composition can be used for injection molding and blow molding. Articles molded from the resin composition maintain their physical properties even during use under severely humid and hot conditions and during prolonged storage.

EXAMPLES

The present invention will hereinafter be described further specifically by way of examples. However, it should be understood that the invention be not limited to the following examples.

The following measurement methods were employed for evaluation of Examples and Comparative Examples described blow.

(1) Molecular Weight

The weight average molecular weight of polylactic acid was determined at 40° C. with the use of tetrahydrofuran as an eluent by means of a gel permeation chromatography (GPC) device (available from Shimadzu Co., Ltd.) having a differential refractometer, and expressed on the basis of polystyrene calibration standards. A sample was dissolved in chloroform and diluted by THF.

(2) Flexural Breakdown Strength

In conformity with ASTM-790, a test strip having a size of 150 mm×10 mm×3.2 mm was prepared, and the flexural breakdown strength was measured with a load being applied to the test strip at a deformation rate of 1 mm/min.

(3) Melt Flow Rate (MFR)

In conformity with JIS K7210, the melt flow rate was measured under conditions D specified in Table 1 of Appendix A of JIS K7210 (with a load of 21.2N at a test temperature of 190° C.).

Figure 1:
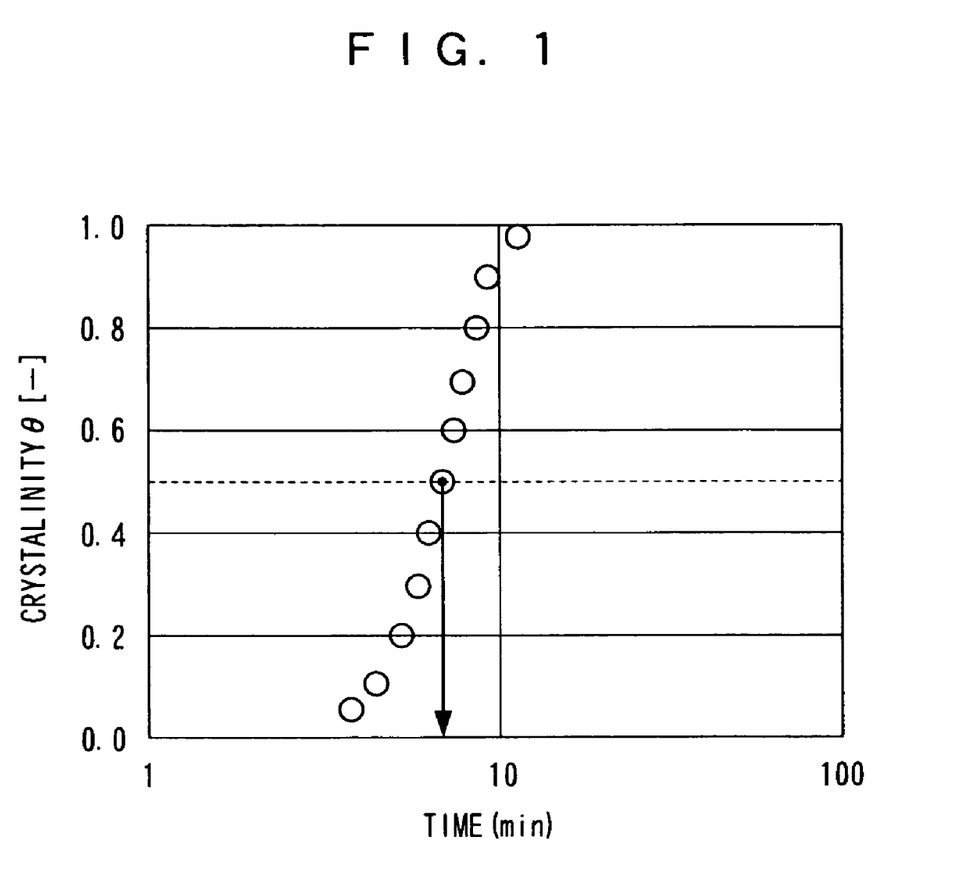
FIG. 1 is a graph illustrating a relationship between crystallinity (θ) and time (minute) for determining a crystallization rate index according to the present invention.

(4) Crystallization Rate Index (See FIG. 1)

With the use of a DSC machine (Pyrisl DSC available form Perkin Elmer Corporation), a sample was heated at a temperature increasing rate of +500° C./min from 20° C. to 200° C., and kept at 200° C. for 5 minutes. Then, the sample was cooled at a temperature decreasing rate of −500° C./min from 200° C. to 130° C., and kept at 130° C. for crystallization. With the final crystallinity (θ) defined as 1, as shown in a graph of FIG. 1, time required for the crystallinity to reach 0.5 was determined as the crystallization rate index (min).

(5) Amount of Terminal Carboxyl Groups

First, 0.15 g of a resin was dissolved in 20 ml of methylene chloride, and an indicator (Phenol Red) was added to the resulting solution. Then, the solution was titrated with a 0.1N KOH solution.

(6) Evaluation of Injection Moldability

With the use of an injection molding machine (IS-100E available from Toshiba Machine Co., Ltd.), a resin was injection-molded in a releasable cup mold (having a diameter of 38 mm and a height of 300 mm and kept at a temperature of 110° C.) at a molding temperature of 200° C., and a minimum cycle time required for proper release of a cup was determined.

(7) Evaluation of Hydrolysis Resistance

A test strip having a size of 150 mm×10 mm×3.2 mm in conformity with ASTM-790 and pellets were stored in a constant temperature/constant humidity chamber (Model IW221 available from Yamato Science Co., Ltd.) at a temperature of 60° C. and a humidity of 95% for 15 to 30 days. Then, the flexural breakdown strength of the test strip was measured, and the MFR of the pellets was measured after the pellets were dried at 50° C. for 50 hours in a vacuum condition. The flexural breakdown strength was evaluated as a retention ratio (%) which was determined on the basis of an initial flexural breakdown strength.

Ingredients and auxiliary materials used for Examples and Comparative Examples are as follows.

A. Biodegradable Polyester Resins

Resin A: Polylactic acid (having a weight average molecular weight of 200,000, an L-lactic acid ratio of 99%, a D-lactic acid ratio of 1%, a melting point of 168° C. and an MFR of 3 g/10 min)

Resin B: A blend containing the resin A (polylactic acid) and a copolymer of terephthalic acid, adipic acid and 1,4-butandiol (having a melting point of 108° C. and an MFR of 5 g/10 min) in a mass ratio of 90/10

B. Crosslinking Agents (1) (Meth)Acrylate Compounds

PEGDM: Polyethylene glycol dimethacrylate (available from Nippon Yushi Co., Ltd., and having an ethylene glycol polymerization degree of 4)

EGDM: Ethylene glycol dimethacrylate (available from Nippon Yushi Co., Ltd.)

DEGDM: Diethylene glycol dimethacrylate (available from Nippon Yushi Co., Ltd.)

(2) Polyvalent Isocyanate Compound

HMDI: Hexamethylene diisocyanate (available from Nakarai chemical Ltd.)

Di-t-butylperoxide (available from Nippon Yushi Co., Ltd.) was used as a crosslinking assist agent.

C. Terminal Blocking Agents

CDI: N,N'-di-2,6-diisopropylphenylcarbodiimide (STABAKSOL I available from Bayer Corporation)

CDP: Aromatic polycarbodiimide (STABAKSOL P available from Bayer Corporation)

CDC: Polycyclohexylcarbodiimide (LA-1 available from Nisshinbo Industries, Inc.)

EPX: p-t-butylphenyl glycidyl ether (DENACOL EX-146 available from Nagase Chemical Co., Ltd.)

EX: Ethylene glycol diglycidyl ether (DENACOL EX-810 available from Nagase Chemical Co., Ltd.)

OXZ: 2,2'-m-phenylenebis(2-oxazoline) (available from Tokyo Chemical Industry Co., Ltd.)

D. Layered Silicate

SBN-E: Montmorillonite with its interlayer ions replaced by trimethyloctadecylammonium ions (available from Hojun Co., Ltd. and having an average particle diameter of 2.5 μm)

MEE: Synthesized fluorinated mica with its interlayer ions replaced by dihydroxyethylmethyldodecylammonium ions (available from Corp Chemical Co., Ltd. and having an average particle diameter of 6.3 μm)

Example 1

First, 100 parts by mass of the resin A and 0.8 parts by mass of the terminal blocking agent CDI were dry-blended and supplied into a hopper of a biaxial extruder (PCM-30 available from Ikegai Co., Ltd., and having a die having three 4-mm diameter holes, an extrusion head temperature of 210° C. and a die outlet temperature of 190° C.). Then, a solution containing 0.2 parts by mass of PEGDM and 0.4 parts by mass of the crosslinking assist agent dissolved in 1 part by mass of an acetyltributyl citrate plasticizer was injected into a middle portion of a kneader by means of a pump. The resulting mixture was extruded, pelletized and dried. Thus, an aliphatic polyester resin composition was prepared. The results of the evaluation of the physical properties and the hydrolysis resistance of the composition thus prepared are shown in Table 1.

Examples 2 to 18 and Comparative Examples 1 to 6

Resin compositions were prepared in substantially the same manner as in Example 1, except that different types and amounts of biodegradable polyester resins, crosslinking agents, lamellar silicates and terminal blocking agents were used as shown in Table 1. Then, the resin compositions were evaluated. The results of the evaluation are shown in Table 1. In Examples 5, 6, 8, 9, 11, 12 and 13 and Comparative Example 4, the addition of the layered silicate was achieved by dry-blending the biodegradable polyester resin and the layered silicate and supplying the resulting mixture into the hopper.

Example 19

First, 100 parts by mass of the resin A was supplied into the hopper of the same biaxial extruder as employed in Examples 1 to 18. Then, a solution containing 0.2 parts by mass of PEGDM and 0.4 parts by mass of the crosslinking assist agent dissolved in 1 part by mass of an acetyltributyl citrate plasticizer was injected into a first feed port provided at the middle of the kneader (a feed port closest to the hopper) by means of a pump, and 1.5 parts by mass of the terminal blocking agent CDI was supplied into a second feed port by a feeder. The resulting mixture was extruded, pelletized and dried. Thus, an aliphatic polyester resin composition was prepared. The results of the evaluation of the resin composition are shown in Table 1.

TABLE 1

| | | Example | | | | | | | |
|---|---|---|---|---|---|---|---|---|---|
| | | 1 | 2 | 3 | 4 | 5 | 6 | 7 | 8 |
| Major ingredients for resin composition (parts by mass) | | | | | | | | | |
| Biodegradable resin | Type | A | A | A | A | A | A | A | A |
| | Amount | 100 | 100 | 100 | 100 | 100 | 100 | 100 | 100 |
| Crosslinking agent | Type | PEGDM | PEGDM | PEGDM | PEGDM | PEGDM | PEGDM | HMDI | HMDI |
| | Amount | 0.2 | 0.2 | 0.2 | 0.2 | 0.2 | 0.2 | 0.05 | 0.05 |
| Layered silicate | Type | — | — | — | — | SBN-E | MEE | — | SBN-E |
| | Amount | 0 | 0 | 0 | 0 | 4 | 4 | 0 | 4 |
| Terminal blocking agent | Type | CDI | CDI | CDI | CDI | CDI | CDI | CDI | CDI |
| | Amount | 0.5 | 1.5 | 2.0 | 8.0 | 2.0 | 2.0 | 2.0 | 2.0 |
| Physical properties of Composition | | | | | | | | | |
| Flexural breakdown strength (MPa) | | 130.1 | 129.6 | 129.3 | 127.8 | 112.0 | 109.2 | 130.4 | 119.2 |
| MFR (g/10 min) | | 1.1 | 1.1 | 1.2 | 1.3 | 0.8 | 0.9 | 1.5 | 1.3 |
| Crystallization rate index (min) | | 1.4 | 1.4 | 1.4 | 1.5 | 1.0 | 1.1 | 1.6 | 1.1 |
| Amount of terminal carboxyl groups (mol/t) | | 4 | 1 | 0 | 0 | 0 | 1 | 0 | 1 |
| Moldability Injection molding cycle (sec) | | 58 | 58 | 58 | 59 | 39 | 41 | 62 | 42 |
| Evaluation of hydrolysis resistance* | | | | | | | | | |
| 15 days | Flexural breakdown strength (MPa) | 122.3 | 127.0 | 129.2 | 127.9 | 107.5 | 103.7 | 129.1 | 112.0 |
| | Retention ratio (%) | 94 | 98 | 100 | 100 | 96 | 95 | 99 | 94 |
| | MFR (g/10 min) | 1.6 | 1.4 | 1.3 | 1.3 | 1.1 | 1.3 | 1.8 | 1.7 |
| 30 days | Flexural breakdown strength (MPa) | 117.1 | 121.8 | 125.4 | 126.5 | 100.8 | 98.3 | 121.3 | 101.3 |
| | Retention ratio (%) | 90 | 94 | 97 | 99 | 90 | 90 | 93 | 85 |
| | MFR (g/10 min) | 2.2 | 1.8 | 1.5 | 1.5 | 1.8 | 2.0 | 2.5 | 2.7 |

| | | Example | | | | | | | |
|---|---|---|---|---|---|---|---|---|---|
| | | 9 | 10 | 11 | 12 | 13 | 14 | 15 | 16 |
| Major ingredients for resin composition (parts by mass) | | | | | | | | | |
| Biodegradable resin | Type | A | B | B | A | A | A | A | A |
| | Amount | 100 | 100 | 100 | 100 | 100 | 100 | 100 | 100 |
| Crosslinking agent | Type | HMDI | PEGDM | PEGDM | PEGDM | PEGDM | PEGDM | PEGDM | PEGDM |
| | Amount | 0.05 | 0.2 | 0.2 | 0.2 | 0.2 | 0.2 | 0.2 | 0.2 |
| Layered silicate | Type | MEE | — | SBN-E | SBN-E | SBN-E | — | — | — |
| | Amount | 4 | 0 | 4 | 4 | 4 | 0 | 0 | 0 |
| Terminal blocking agent | Type | CDI | CDI | CDI | EPX | OXZ | CDP | CDC | EX |
| | Amount | 2.0 | 2.0 | 2.0 | 2.0 | 2.0 | 0.5 | 0.5 | 2.0 |
| Physical properties of Composition | | | | | | | | | |
| Flexural breakdown strength (MPa) | | 114.4 | 113.0 | 113.0 | 110.3 | 113.0 | 129.8 | 128.9 | 108.2 |
| MFR (g/10 min) | | 1.4 | 1.4 | 1.1 | 0.9 | 0.8 | 1.1 | 1.1 | 1.0 |

TABLE 1-continued

|  |  |  |  |  |  |  |  |  |
|---|---|---|---|---|---|---|---|---|
| Crystallization rate index (min) | 1.3 | 3.5 | 3.1 | 1.0 | 1.1 | 1.4 | 1.4 | 1.1 |
| Amount of terminal carboxyl groups (mol/t) | 0 | 1 | 1 | 3 | 5 | 1 | 3 | 1 |
| Moldability Injection molding cycle (sec) | 44 | 60 | 39 | 40 | 40 | 58 | 58 | 42 |
| Evaluation of hydrolysis resistance* | | | | | | | | |
| 15 days Flexural breakdown strength (MPa) | 106.4 | 110.7 | 106.2 | 99.3 | 96.1 | 126.4 | 125.1 | 105.1 |
| Retention ratio (%) | 93 | 98 | 94 | 90 | 85 | 97 | 97 | 97 |
| MFR (g/10 min) | 1.9 | 1.6 | 1.5 | 1.8 | 2.1 | 1.4 | 1.4 | 1.2 |
| 30 days Flexural breakdown strength (MPa) | 95.0 | 100.6 | 92.7 | 83.8 | 78.0 | 120.6 | 119.4 | 101.8 |
| Retention ratio (%) | 83 | 89 | 82 | 76 | 69 | 93 | 93 | 94 |
| MFR (g/10 min) | 3.1 | 2.3 | 2.4 | 3.9 | 4.8 | 1.7 | 1.8 | 1.4 |

|  |  | Example | | | Comparative Example | | | | | |
|---|---|---|---|---|---|---|---|---|---|---|
|  |  | 17 | 18 | 19 | 1 | 2 | 3 | 4 | 5 | 6 |
| Major ingredients for resin composition (parts by mass) | | | | | | | | | | |
| Biodegradable resin | Type | A | A | A | A | A | A | A | B | B |
|  | Amount | 100 | 100 | 100 | 100 | 100 | 100 | 100 | 100 | 100 |
| Crosslinking agent | Type | DEGDM | EGDM | PEGDM | — | PEGDM | PEGDM | HMDI | PEGDM | PEGDM |
|  | Amount | 0.2 | 0.2 | 0.2 | 0.0 | 0.2 | 0.2 | 0.05 | 0.2 | 0.2 |
| Layered silicate | Type | — | — | — | — | — | SBN-E | — | — | SBN-E |
|  | Amount | 0 | 0 | 0 | 0 | 0 | 4 | 0 | 0 | 4 |
| Terminal blocking agent | Type | CDI | CDI | CDI | CDI | — | — | — | — | — |
|  | Amount | 2.0 | 2.0 | 3.0 | 1.5 | 0 | 0 | 0 | 0 | 0 |
| Physical properties of Composition | | | | | | | | | | |
| Flexural breakdown strength (MPa) | | 128.5 | 128.1 | 129.9 | 110.9 | 136.2 | 111.2 | 138.5 | 138.0 | 112.0 |
| MFR (g/10 min) | | 1.2 | 1.2 | 1.1 | 3.1 | 1.1 | 0.8 | 1.4 | 1.4 | 1.1 |
| Crystallization rate index (min) | | 1.4 | 1.4 | 1.4 | 105 | 1.4 | 1.0 | 1.6 | 3.5 | 3.1 |
| Amount of terminal carboxyl groups (mol/t) | | 0 | 0 | 2 | 0 | 22 | 26 | 23 | 25 | 27 |
| Moldability Injection molding cycle (sec) | | 58 | 58 | 58 | ≧600 | 58 | 39 | 61 | 60 | 40 |
| Evaluation of hydrolysis resistance* | | | | | | | | | | |
| 15 days Flexural breakdown strength (MPa) | | 128.4 | 128.0 | 117.2 | 99.8 | 12.9 | 0.5 | 8.3 | 5.5 | 1.3 |
| Retention ratio (%) | | 100 | 100 | 90 | 90 | 9 | 0.4 | 6 | 4 | 1 |
| MFR (g/10 min) | | 1.2 | 1.2 | 1.7 | 4.5 | — | — | — | — | — |
| 30 days Flexural breakdown strength (MPa) | | 127.1 | 126.0 | 102.4 | 61.0 | — | — | — | — | — |
| Retention ratio (%) | | 99 | 98 | 79 | 55 | — | — | — | — | — |
| MFR (g/10 min) | | 1.3 | 1.4 | 3.4 | 18.2 | — | — | — | — | — |

*Symbol - in evaluation means that measurement was impossible. (For flexural breakdown strength, test strips had strength insufficient for the measurement. For MFR, samples had an extremely reduced molecular weight such that polymer's nature was lost.)
*Crosslinking agent and terminal blocking agent were added in this order in Example 19, and in reverse order in other examples.

As apparent from Table 1, the resin compositions of Examples 1 to 19 were excellent in injection moldability with higher crystallization rate indices. These resin compositions maintained their physical properties (e.g., strength) even after having been stored under the severely humid and hot conditions for the evaluation of the hydrolysis resistance.

On the contrary, the resin composition of Comparative Example 1 had a lower crystallization rate, a longer injection molding cycle and a poorer moldability, because no crosslinking agent was added. Further, the hydrolysis resistance was poorer.

The resin compositions of Comparative Examples 2 to 6 had virtually no hydrolysis resistance, because no terminal blocking agent was added.

Further, the following facts are revealed.

A comparison between Example 2 and Comparative Example 1 shows that the resin composition of Example 2 with the polylactic acid crosslinked by the PEGDM had a significantly higher crystallization rate and a significantly shorter injection molding cycle than the resin composition of Comparative Example 1. Although the same type and amount of terminal blocking agent was used, the resin composition of Example 2 was more excellent in hydrolysis resistance. Therefore, the resin composition prepared by utilizing the terminal blocking and the crosslinking in combination was more excellent in physical property retention under the high temperature and high humidity conditions than the terminal-blocked resin.

A comparison between Examples 1 to 4 and Comparative Example 2 shows that the resin compositions of Examples 1 to 4 maintained their physical properties even after having been stored under the high temperature and high humidity conditions for the evaluation of the hydrolysis resistance, because proper amounts of the terminal blocking agent were used for the terminal blocking. In Examples 1 to 4, different amounts of the terminal blocking agent ranging from 0.5 to 8 parts by mass were added and, as a result, it was found that the physical property retention ratio was increased correspondingly to the amounts of the added terminal blocking agent.

In Examples 5 and 6, the addition of the layered silicate increased the crystallization rate thereby to reduce the injection molding cycle as compared with Example 3 in which the resin composition was prepared substantially in the same manner except that no layered silicate was added. Although Example 5 and Comparative Example 3 differ in whether or not the terminal blocking agent was added, the resin composition of Example 5 with the terminal-blocked resin maintained its physical properties even after having been stored under the high temperature and high humidity conditions for the evaluation of the hydrolysis resistance.

Examples 7 to 9 in which the polylactic acid was crosslinked by the isocyanate compound (HMDI) provided the same effect as Examples 3, 5 and 6 in which the polylactic acid was crosslinked by the PEGDM.

In Examples 10 and 11, the blend of the polylactic acid and the copolymer of terephthalic acid, adipic acid and 1,4-butandiol was used as the biodegradable resin, but the addition of the crosslinking agent or the addition of the crosslinking agent and the layered silicate increased the crystallization rate and reduced the injection molding cycle. Although Examples 10 and 11 differ from Comparative Examples 5 and 6 in whether or not the terminal blocking agent was added, the resin composition with the terminal-blocked resin maintained its physical properties even after having been stored under the high temperature and high humidity conditions for the evaluation of the hydrolysis resistance.

In Examples 12 and 13 in which the resin was terminal-blocked by the epoxy compound and the oxazoline compound, respectively, the physical properties were maintained even after storage under the high temperature and high humidity conditions for the evaluation of the hydrolysis resistance.

In Examples 14 and 15 in which CDP and CDC were respectively employed as the terminal blocking agent unlike in Example 1, the crystallization rate indices and the injection molding cycles were equivalent to those of Example 1, and the hydrolysis resistance was slightly improved as compared with Example 1.

In Example 16 in which EX was employed as the terminal blocking agent unlike in Example 1, the crystallization rate index, the injection molding cycle and the hydrolysis resistance were slightly improved as compared with Example 1.

In Examples 17 and 18, the (meth)acrylate compound having shorter ethylene glycol chains was employed instead of PEGDM for the crosslinking, but physical properties equivalent to those of Example 3 were provided.

In Example 19, the crosslinking agent and the terminal blocking agent were added in reverse order as compared with Examples 1 to 18. As a result, the crystallization rate and the injection molding cycle were equivalent to those in Examples 1 to 3, but the hydrolysis resistance was slightly poorer even with the addition of a greater amount of the terminal blocking agent as compared with Examples 1 to 3. However, the hydrolysis resistance was significantly improved as compared with Comparative Example 1 in which the crosslinking agent was not added. Therefore, the resin composition of Example 19 had sufficiently practical properties.

The invention claimed is:

1. An aliphatic polyester resin composition comprising a biodegradable polyester resin (A) which essentially comprises an α- and/or β-hydroxycarboxylic acid unit wherein some or all of carboxyl groups of the resin (A) are blocked by 0.01 to 20 parts by mass of a terminal blocking agent (C) consisting of carbodiimide compounds based on 100 parts by mass of the resin (A), and further is crosslinked by at least one crosslinking agent (B) selected from the group consisting of (meth)acrylate compounds and polyvalent isocyanate compounds, and a peroxide.

2. An aliphatic polyester resin composition as set forth in claim 1, wherein the crosslinking agent (B) is present in a proportion of 0.01 to 10 parts by mass based on 100 parts by mass of the biodegradable polyester resin (A).

3. An aliphatic polyester resin composition as set forth in claim 1, wherein the biodegradable polyester resin (A) essentially comprises one of poly(L-lactic acid), poly(D-lactic acid), a copolymer of L-lactic acid and D-lactic acid and a blend of poly(L-lactic acid) and poly(D-lactic acid).

4. An aliphatic polyester resin composition as set forth in claim 1, further comprising 0.05 to 30 parts by mass of a layered silicate (D) based on 100 parts by mass of the biodegradable polyester resin (A).

5. A method for preparing an aliphatic polyester resin composition which comprises a biodegradable polyester resin (A) essentially comprising an α- and/or β-hydroxycarboxylic acid unit wherein some or all of carboxyl groups of the resin (A) are blocked by 0.01 to 20 parts by mass of a terminal blocking agent (C) consisting of carbodiimide compounds based on 100 parts by mass of the resin (A), and further being crosslinked by at least one crosslinking agent (B) selected from the group consisting of (meth)acrylate compounds and polyvalent isocyanate compounds, and a peroxide, the method comprising: mixing the biodegradable polyester resin (A) and the terminal blocking agent (C); and then mixing the crosslinking agent (B) and the peroxide with the resulting mixture.

6. A molded article or a foamed article produced from an aliphatic polyester resin composition as recited in claim 1.

7. A molded article or a foamed article produced from an aliphatic polyester resin composition as recited in claim 2.

8. A molded article or a foamed article produced from an aliphatic polyester resin composition as recited in claim 3.

9. A molded article or a foamed article produced from an aliphatic polyester resin composition as recited in claim 4.

* * * * *